(12) United States Patent
Colbert et al.

(10) Patent No.: US 8,943,194 B2
(45) Date of Patent: Jan. 27, 2015

(54) APPARATUS, AND ASSOCIATED METHOD, FOR RESUBSCRIBING COMMUNICATION DEVICE TO A PUSH NOTIFICATION SERVICE

(75) Inventors: Michael Scott Colbert, Debary, FL (US); Rohit Anil Talwalkar, Plantation, FL (US); Swee Tuan Pang, Oakville (CA)

(73) Assignee: Blackberry Limited, Waterloo (CA)

( * ) Notice: Subject to any disclaimer, the term of this patent is extended or adjusted under 35 U.S.C. 154(b) by 162 days.

(21) Appl. No.: 13/440,233

(22) Filed: Apr. 5, 2012

(65) Prior Publication Data

US 2013/0268641 A1 Oct. 10, 2013

(51) Int. Cl.
*G06F 15/173* (2006.01)

(52) U.S. Cl.
USPC .......................................... 709/224; 709/223

(58) Field of Classification Search
CPC ............... G06F 17/30905; H04M 1/72563; H04M 1/72525; H04M 1/72561
USPC ................................................ 709/223, 224
See application file for complete search history.

(56) References Cited

U.S. PATENT DOCUMENTS

| | | | | |
|---|---|---|---|---|
| 2005/0261016 A1* | 11/2005 | Patel et al. | | 455/518 |
| 2010/0120453 A1* | 5/2010 | Tamchina et al. | | 455/466 |
| 2010/0227632 A1 | 9/2010 | Bell et al. | | |
| 2012/0096513 A1* | 4/2012 | Raleigh et al. | | 726/1 |
| 2012/0108198 A1* | 5/2012 | Edge et al. | | 455/404.2 |

FOREIGN PATENT DOCUMENTS

| | | |
|---|---|---|
| EP | 1773039 A1 | 4/2007 |
| EP | 2312873 A2 | 4/2011 |

* cited by examiner

*Primary Examiner* — David Lazaro
*Assistant Examiner* — Marie Georges Henry
(74) *Attorney, Agent, or Firm* — Blake, Cassels & Graydon LLP; Wilfred P. So; Brett J. Slaney

(57) ABSTRACT

An apparatus, and an associated method, for a communication device having a SIM card, or other removable storage element, that permits hot-swapping of the storage element. Notification of hot-swapping of the removable storage element is detected. Responsive to the detection, provision is made to resubscribe to push service notifications that are disabled upon removal of the removable storage element.

20 Claims, 5 Drawing Sheets

APPARATUS, AND ASSOCIATED METHOD, FOR RESUBSCRIBING COMMUNICATION DEVICE TO A PUSH NOTIFICATION SERVICE

The present disclosure relates generally to a manner by which to provide a push service to a communication device having a removable storage element, such as a SIM (Subscriber Identity Module) card. More particularly, e.g., the present disclosure relates to an apparatus, and an associated method, that provides for resubscription to a push service subsequent to change of the SIM card, or other removable storage element, at the communication device.

Upon notification of detection of change of the removable storage element during operation of the communication device, the communication device is resubscribed to the push notification service. The resubscription compensates for disabling of the push service upon removal of the removal storage element out of connection with the communication device.

BACKGROUND

Communication devices, such as so-called smart phones, personal digital assistants, tablet computing devices, and other wireless, and wired, devices, often times are constructed to provide for push notification services. Instant messaging services and push email services are exemplary of push notification services. Typically, a push notification service is provided in response to a subscription or other service request for the push notification service.

A push notification service is typically provided by a push-service provider, sometimes referred to as a push initiator. A push provider pushes asynchronous notifications to a communication device, sometimes referred to as a client device and client applications maintained at the communication device that utilize the push notifications. A client application that receives the push notifications is sometimes referred to as a push target.

Because push notifications are pushed to the device without requiring a user of the device to request the delivery of the notification, the notification is made available to the user of the device immediately and does not require the user of the device to make special request for delivery of the notification.

Communication devices sometimes utilize removable, or other, storage elements that store identification, and other, information that is accessed pursuant to communications of the communication device with a wireless network. A wireless device operable in a multi-user communication system, for instance, sometimes includes an IMSI (International Mobile Subscriber Identity) value that is used for purposes of identification when requesting connectivity with the network. A SIM card defined and used by wireless devices in various cellular communication systems is exemplary of such a storage element. Because SIM cards, and other similar storage elements are removable, a user of a wireless device is able to change-out the SIM card of the wireless device. The user may, for instance, maintain subscriptions with more than one communication system with the different communication systems associated with different ones of the SIM cards. A SIM card is selected depending upon which subscription or communication system is to be utilized.

When a SIM card is changed-out, i.e., "swapped", a push service at the wireless device is disabled. If the SIM card or other removable storage element is "hot-swappable", that is, removable and replaceable while the wireless device is operated, the user of the device might continue using the device and not be aware that the push service has been disabled. And, as a result, the user of the device might be unaware that push service notifications are no longer delivered to the device.

It is in light of this background information related to communication devices that the significant improvements of the present disclosure have evolved.

DETAILED DESCRIPTION

Figure 1:
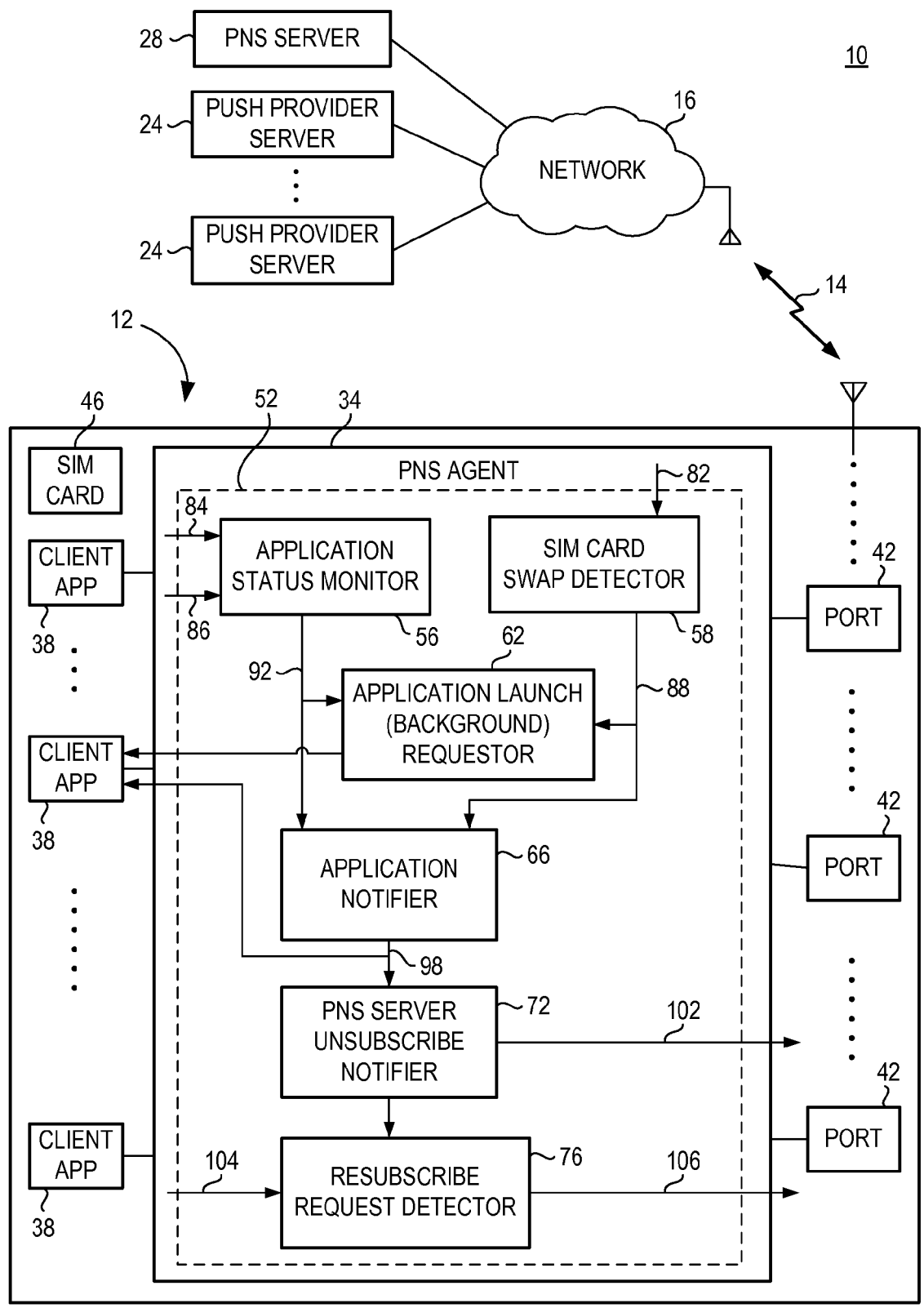
FIG. 1 illustrates a functional block diagram of an exemplary communication system having a communication device in which an implementation of the present disclosure is embodied.

The present disclosure, accordingly, advantageously provides an apparatus, and an associated method, by which to provide a push service to a communication device having a removable storage element, such as a wireless device that utilizes a SIM (Subscriber Identity Module) card.

Through operation of an implementation of the present disclosure, a manner is provided by which to provide for resubscription to a push service subsequent to change of a SIM card, or other removable storage element, at the communication device.

In one aspect of the present disclosure, a manner is provided by which to resubscribe to a push service subsequent to hot-swapping of the removable storage element during operation of the communication device. Upon notification of detection of the hot-swapping of the removable storage element, a resubscription request is sent to request subscription to a push service. Interruption in delivery of push notifications does not occur once the communication device is resubscribed to the push notification service.

In another aspect of the present disclosure, a detector detects notification of hot-swapping, or other change of a removable storage element during operation of a communication device. The notification comprises, for instance, a message that is provided when a SIM card is removed and also replaced with a replacement SIM card. The removal and replacement occur during operation of the communication device.

In another aspect of the present disclosure, upon detection of the notification, the detector further detects whether a client application at the communication device and associated with a push notification service is online, i.e., active or running. The detector also detects, thereby, whether the client application is offline, i.e., inactive or not running.

If notification is detected both that the removable storage element has been removed and replaced and that the client application is online, i.e., running, then a resubscription provider sends an indication to the client application to notify the client application of the removal and replacement of the removable storage element. Then, an unsubscribe request is generated and sent to a push notification server and, in turn, to the push notification provider. The unsubscribe request is a request to terminate the push notification service that is being provided by the push notification service provider. Then, the resubscription provider is provided with a request generated by the client application maintained at the communication device to resubscribe to the push notification service.

If notification is detected both that the removable storage element has been removed and replaced and that the client application is offline, i.e., not running, then a resubscription provider generates a request to launch the client application associated with the push service. The request to launch the application forms a request to launch the application on background, i.e., as a background operation. The client application, upon receipt of the request, activates, i.e., is placed online or runs. An indication is provided to the resubscription provider when the client application is online. When the resubscription provider is notified of the online status of the client application, the resubscription provider sends a message to the client application to inform the client application of the removal and replacement of the removable storage element. The resubscription provider also forms an unsubscribe message that is sent to a push notification server and, in turn, to a push provider to unsubscribe the communication device from the push notification service. Once unsubscribed, further push notifications will not be attempted to be sent pursuant to the push service to the communication device. Thereafter, the client application resubscribes to the push notification service in order to receive subsequent push notifications.

In another aspect of the present disclosure, the detection of the removal and replacement of the removable storage element and subsequent resubscription operation are carried out automatically and are thereby transparent to a user of the communication device. In an alternate implementation, the communication device includes a user interface at which a user of the communication device is prompted to affirm selection to resubscribe to the push notification service.

Thereby, through operation of an implementation of the present disclosure, hot-swapping of a SIM card, or other storage element, during operation of the communication device, which causes disabling of push notification services at the communication device, is overcome by providing for resubscription to the push notification services. Push notifications which might otherwise be misdirected or otherwise not be properly delivered, are provided to the communication device subsequent to the resubscription.

In these and other aspects, therefore, an apparatus, and an associated method, is provided for facilitating operation of a push service at a communication device that has a removable storage element. Notification of change of the removable storage element is detected. Thereafter, provision is made for resubscription of the push service to receive push messages subsequent to the change of the removable storage element.

Turning first to FIG. 1, a communication system 10 provides for communications with communication devices 12, here represented by a wireless device, such as, by way of example and not limitation, a smart phone, portable digital assistant, cellular telephone, portable computer, mobile device, cellular handset, handheld computer, desktop computer, laptop computer, wireless appliance, tablet computing device, or other similar technology. Communications are effectuated with the communication devices 12 by way of radio channels 14, represented by the bidirectional arrow in FIG. 1. The channels are, for instance, defined upon a radio air interface extending between a network portion 16 and the communication devices.

Communication services are carried out with, and by, the communication devices during operation of the communication system. Push notification services, for instance, provide for push notifications to be sent to a communication device to carry out the push notification service.

Push notifications are sourced at a push provider, such as any of the push provider servers 24 shown in FIG. 1. A PNS (Push Notification Service) server 28 is placed in communication connectivity with the push provider servers 24 by way of the network portion 16. The PNS server 28 terminates always-on connections from communication devices, such as the communication device 12. In operation, the PNS server receives notifications from provider service instances, here represented by the provider servers 24 and forwards the notifications on to the appropriate communication devices. When a communication device is not connected to the network portion 16, i.e., the communication device is not in communication connectivity with the network portion, the PNS server 28 stores the notifications until the device is reconnected in the communication connectivity with the network portion.

The communication device 12 includes a PNS (Push Notification Service) agent 34 and client applications 38. While the communication device includes other elements pursuant to communication operations, such other elements are not shown, for purposes of simplicity, in FIG. 1.

In the exemplary implementation, the PNS agent is an entity that implements the client-side interface of the PNS server 28. The PNS agent 34 maintains an always-on connection with the PNS server 28. The PNS agent is provided with push notifications that are delivered to selected ports 42 by the PNS server and then on to appropriate ones of the client applications 38. The communication device forms a client device at which client applications 38 are maintained. The client applications 38 are associated with corresponding providers 24.

The communication device 12 also includes a removable storage element 46, here a SIM card, that has information stored therein that is accessed during operation of the device 12. The storage element is removable and replaceable with an alternate storage element, such as a storage element that contains different information, associated, e.g., with a different system and system operator.

As mentioned previously, the storage element 46 is removable and replaceable during operation of the communication device. That is to say, the removable storage element is hot-swappable. When the storage element is removed and replaced during operation of the device, however, a push notification service at the device is disabled. Push notifications are not delivered to the device and, as a result, a user of the device 12 does not receive the push notifications.

The PNS agent 34 further includes an apparatus 52 of an implementation of the present disclosure. The apparatus 52 is functionally represented, formed of functional elements, implementable in any desired manner including code executable by processing circuitry. Here, the apparatus includes an application status monitor 56, a storage element swap detector 58, an application launch requestor 62, an application notifier 66, a PNS server unsubscribe notifier 72, and a resubscribe request detector 76. During operation, the apparatus provides for resubscription to a push notification service responsive to hot swapping of the removable storage element.

The detector 58 is provided with an indication, here represented on the line 82, of removal and replacement of the removable storage element 46 during operation of the communication device. The indication provided on the line 82 is, e.g., a notification generated by a detection module (not separately shown in FIG. 1).

The application status monitor 56 monitors activity of one, or all, of the client applications 38. Monitoring is performed, for instance, by monitoring a client application for generation of a create session request, here indicated to be provided on the line 84 or an online indication, here represented to be generated on the line 86.

Indications of detections made by the detector 58 and indications of monitored activity of client applications obtained by the monitor 56 are provided to the application launch requestor 62, here indicated by way of the lines 88 and 92, respectively.

The application launch requestor 62 operates to request launch of a client application as a background operation in the event that the monitor 56 indicates the client application 38 to be inactive or offline.

If, conversely, the application status monitor 56 indicates that the client application is online, the application notifier 66, which also receives an indication on the line 88 of detection made by the detector 58, notifies the client application, here indicated by way of the line 98, of the change out of the removable storage element. In the exemplary implementation, the notification to the client application on the line 98 comprises an onSIMCHANGE event message.

Once the notifier 66 generates the notification, the PNS server unsubscribe notifier 72 generates an unsubscribe request, here indicated by way of the line 102, that is for communication to the PNS server 28 to unsubscribe the communication device 12, and the client application thereof, from the push notification service.

Thereafter, the client application 38 is able to request resubscription to the push notification service. The resubscribe request detector 76 detects the request that, in the exemplary implementation, forms a create channel message, here indicated by way of line 104. In response to the detection, the detector forms a request that is forwarded on to the PNS server 28 to request resubscription to the push notification service, which request is here indicated by way of line 106.

Figure 2:
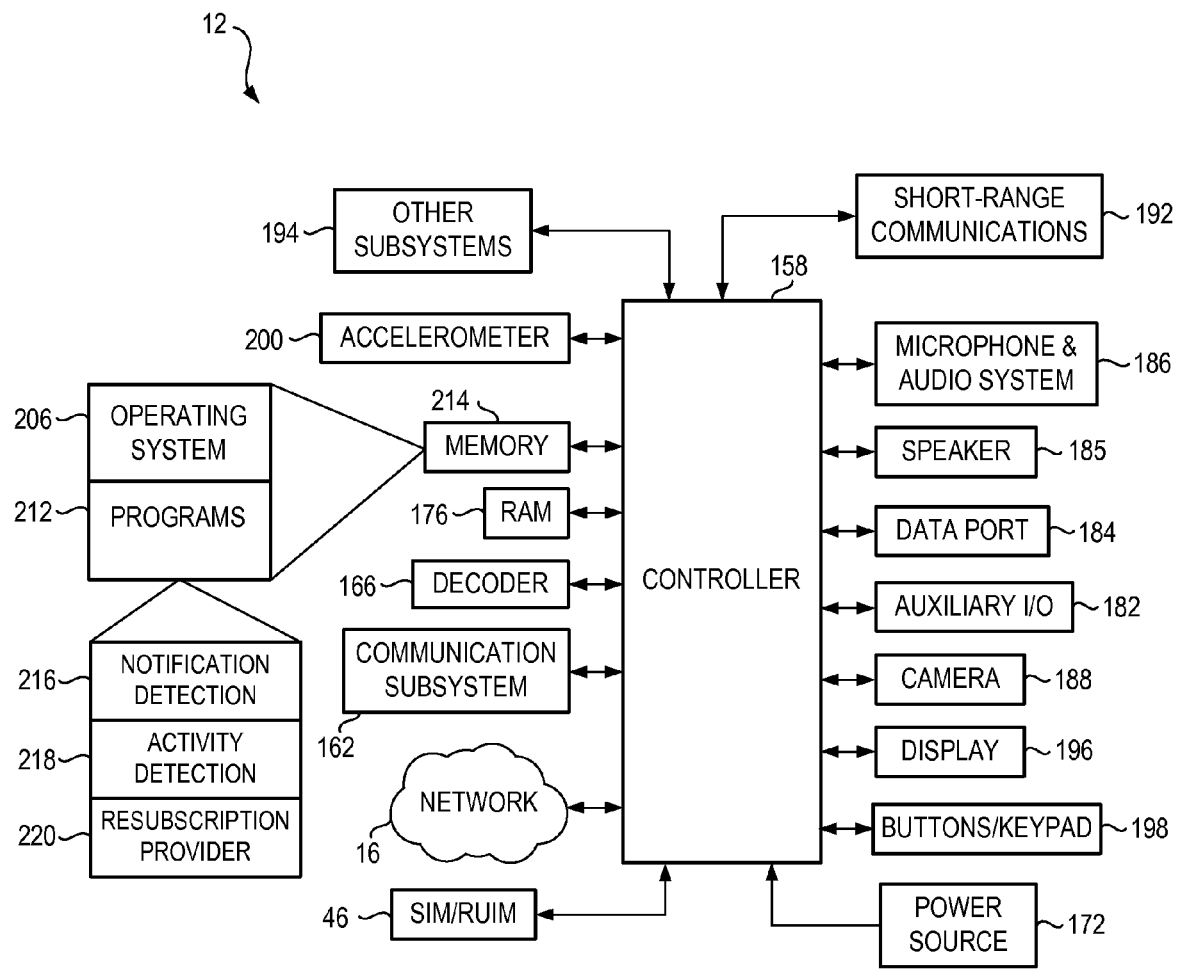
FIG. 2 illustrates a functional block diagram of a communication device of an implementation of the present disclosure that forms part of the communication system shown in FIG. 1.

FIG. 2 illustrates a communication device 12 of an exemplary implementation of the present disclosure. In the implementation shown in FIG. 2, the communication device forms a wireless device, such as a smart phone or other two-way radio device. In other implementations, the communication device is constructed in other manners to provide other functionalities. In such other implementations, the configuration of the communication device is correspondingly altered to provide the functionalities of such other devices, and may include similar or equivalent components.

The communication device includes a controller 158. The controller is implemented by any of various appropriate processors or other control circuits. The controller 158 controls overall operation of the communication device, including control of voice, data, and command communications, which are implemented by a communication subsystem 162. The communication subsystem 162 includes a receiver and a transmitter. The communication subsystem 162 is used, amongst other things, to initiate and to support an active voice call or data communication session. The communication subsystem 162 is comprised of any of various combinations of hardware, software, and firmware to perform various designated functions. The software is functionally or conceptually divided into software modules. Software in one module is able to share or to call upon functions of another module.

Data received by the communication device is processed by a decoder 166, which performs decompression operations. The communication device 12 receives information from, and sends information to, the network portion 16. The communication subsystem 162 facilitates, for instance, initiation and operation of an active call when the communication device is in a real-time, voice communication session. The network 16 is of any of various types of networks including, for example, a cellular network, a wireless data network, a wireless voice network, or a network that supports both voice and data communication services.

A power source 172 provides operative power to operate or to charge elements of the communication device. The power source is implemented, for example with one or more rechargeable batteries or a port to an external power supply.

The controller 158 interacts with additional components of the communication device, here including a RAM (Random Access Memory) 176, and auxiliary I/O (Input/Output) subsystem 182, a data port 184, a speaker 185, a microphone, and an audio system 186, a camera module 188, a short-range communication system 192, and other subsystems 194. The controller 158 further interacts with a display 196 and input buttons or an input keypad 198.

A user of the communication device 12 is able to enter data and to operate functions of the communication device by way of appropriate entries entered at the buttons or keypad 198. The controller 158 interacts with the button/keypad 198, or other input element. The controller 158 further interacts with an accelerometer 200 that detects a direction of gravitational forces or user-input acceleration forces. Contents of the SIM card 46 also are accessible by the controller 158.

The communication device 12 further includes an operating system 206 and software programs 212 formed of program code. The operating system 206 and the software programs 212 are executed by the controller 158 during operation of the communication device. The operating system 206 and the software programs 212 are stored, for example, at a persistent, updatable store, such as the memory 214. Additional applications or programs can be loaded by way of the network portion 16, the auxiliary I/O subsystem 182, the data port 184, the short-range communication subsystem 192, or another subsystem 194 that is suitable for transferring program files. Client applications 38 (FIG. 1) forming push targets for push notifications are also stored at the memory 214 or other location.

The software programs 212 include software modules. Here, software modules associated with the facilitation of operation of a push service at the communication device pursuant to an implementation of the present disclosure are shown. The module includes a notification detection module 216, a client application activity detection module 218 and a resubscription provider module 220. While the functions represented by the modules 216, 218, and 220 are, in the implementation shown in FIG. 2, each formed of program code executable during operation of the controller 158, in alternate implementations, the functionality provided by one or more of the modules is carried out alternately, or additionally, in other manners and in conjunction with other portions of the communication device, either portions that form other software modules or specialized hardware and firmware modules.

During operation, the notification detection module 216 is invoked to detect when the SIM card 46 has been removed and replaced during operation of the communication device. The activity detection module 218 is also invoked to detect whether a push application associated with the push service is active. The resubscription provider module 220 is invoked to provide for resubscription of the push service to receive push messages subsequent to the change of the removable storage element. The manner in which the module performs the resubscription is dependent upon whether the operation of the activity detection module 218 indicates that the client application is active.

Figure 3:
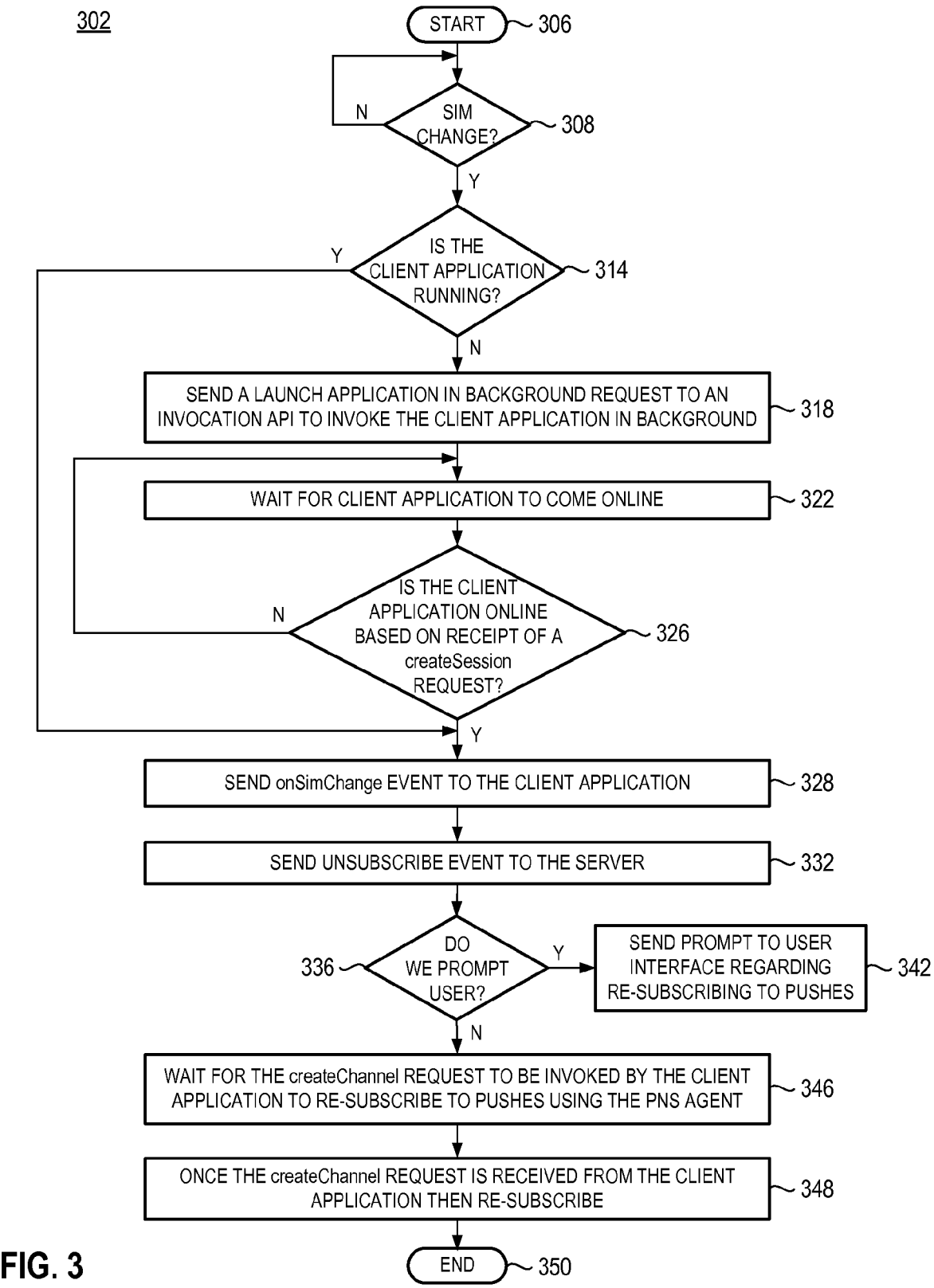
FIG. 3 illustrates a process diagram representative of the process of operation of an implementation of the present disclosure.

FIG. 3 illustrates a process diagram 302 representative of the process of operation of an implementation of the present disclosure. Subsequent to entry, indicated by the start block 306, a determination is made at the decision block 308 as to whether the SIM card, or other removable storage element, has been swapped out. If not, the no branch is taken back to the decision block 308. If, conversely, a change-out of the storage element has been detected, the yes branch is taken to the decision block 314. At the decision block 314, a determination is made as to whether the client application is running, i.e., is active or online. If determination is made that the client application is not running, the no branch is taken to the block 318.

At the block 318, a request is generated and sent to launch the client application as a background operation to an invocation API to invoke the client application in a background mode. Then, and as indicated by the block 322, a wait is generated for the client application to come online. A determination is made at the decision block 326 a determination is made as to whether the client application is online. In the exemplary implementation, the determination is made responsive to detection of receipt of a create session request. If not, the no branch is taken back to the block 322.

If, conversely, the client application is determined to be online, the yes branch is taken to the block 328. At the block 328, an onSIMCHANGE event message is sent to the client application. Then, and as indicated by the block 332, an unsubscribe event message is sent to the PNS server, such as the PNS server 28 shown in FIG. 1.

If a determination is made at the decision block 314 that the client application is running, then the yes branch is taken from the decision block 314 to the block 328 and the onSIMCHANGE event message is sent and then, as indicated by the block 332, the unsubscribe event message is sent.

A branch is then taken to the decision block 336. A determination is made as to whether a user should be prompted with respect to resubscribing to a push notification service. If so, the yes branch is taken to the block 342, and an indication is provided to a user interface to prompt a user to select whether to continue with resubscription operations.

If, conversely, the user is not to be prompted, such as when automatic resubscription is to be performed, the no branch is taken to the block 346. At the block 346, a wait period ensues to wait for a create channel request to be invoked by a client application to resubscribe to push notifications using a PNS agent. Then, as indicated by the block 348, resubscription is carried out once the create channel request is received from a client application. A branch is then taken to the end block 350.

Figure 4:
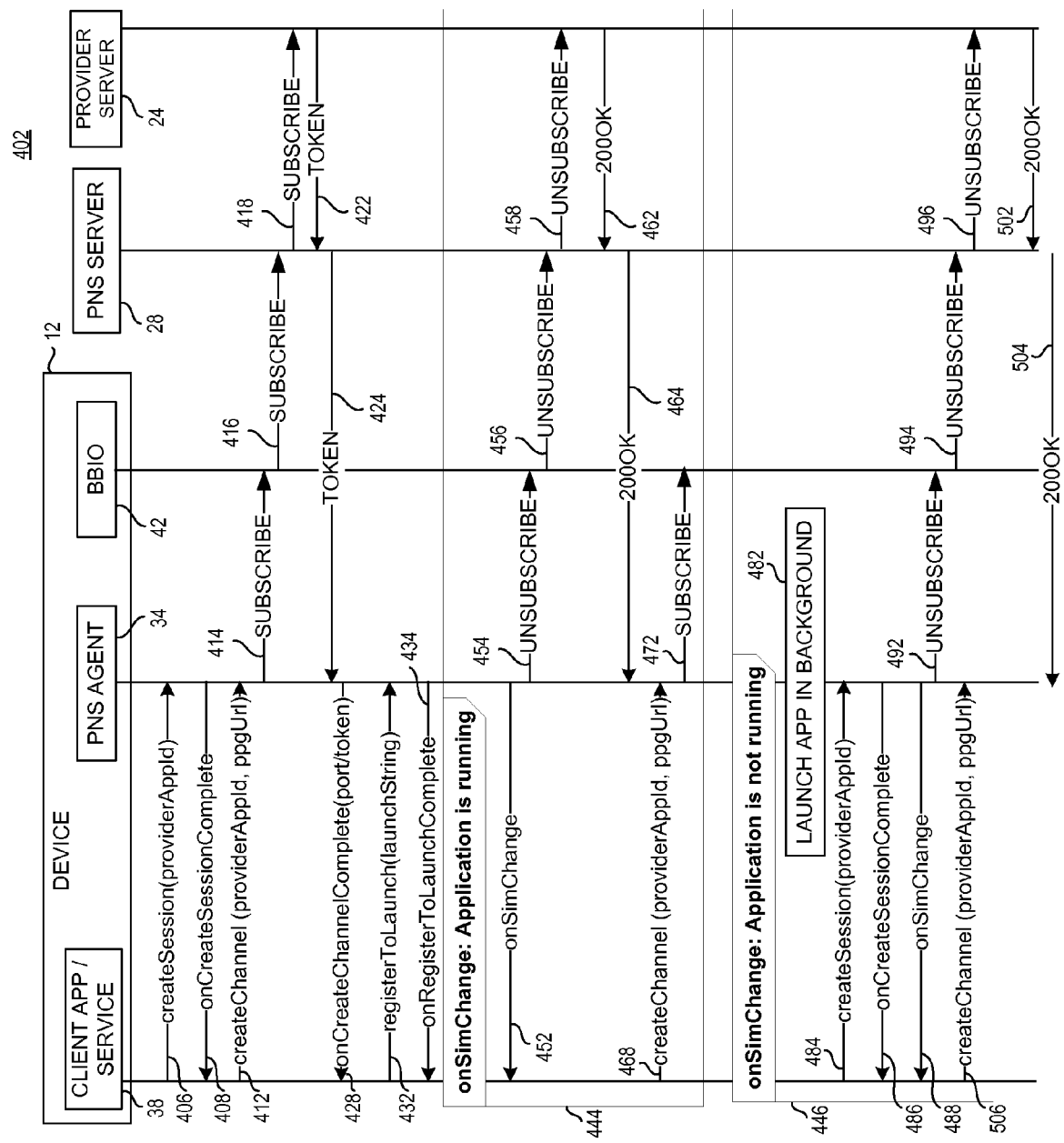
FIG. 4 illustrates a message sequence diagram representative of signaling generated during operation of an implementation of the present disclosure.

FIG. 4 illustrates a message sequence diagram 402 representative of signaling generated during operation of the communication system 10 shown in FIG. 1 pursuant to operation of an implementation of the present disclosure. Signaling between the communication device 12, the PNS server 28, and a provider server 24 is shown in FIG. 4. Additionally, signaling between elements of the communication device is also shown.

Signaling illustrated in FIG. 4 commences with a create session message 406 that is generated by the client application 38 and provided to the PNS agent 34. The PNS agent responds with an on create session complete message, indicated by the segment 408.

Then, and as indicated by the segment 412, the client application 38 generates a create channel message that is provided to the PNS agent 34. The PNS agent, in turn, sends a subscribe request, indicated by the segment 414 and 416 that is forwarded by way of a port 42 to the PNS server 28. The subscribe request is then forwarded on, indicated by the segment 418, to the provider server 24. In response, a token is generated at the provider server 24 and returned, indicated by the segments 422 and 424 to the communication device 12 and the PNS agent 34 thereof.

Subsequent to reception of the token at the PNS agent 34, an on create channel complete message, indicated by the segment 428, is provided to the client application 38. The message includes an indication of the value of the provided token and the port number of the port 42 at which the token is received. Thereafter, and as indicated by the segment 432, the client application generates a register to launch message that is provided to the PNS agent 34. In response, and as indicated by the segment 434, the PNS agent 34 responds with an on register to launch complete message that is provided to the client application 38.

The message sequence diagram 402 further illustrates a signaling sequence 444 representative of signaling generated when a client application 38 is active when a removable storage element is removed and replaced. And, the message sequence diagram 402 also illustrates a signaling sequence 446 representative of signaling generated when a client application 38 is offline when the removable storage element is removed and replaced.

The sequence 444 commences with the generation of an on SIM change message, indicated by the segment 452, generated by the PNS agent 34 and provided to the client application 38. The PNS agent 34 also generates an unsubscribe message that is routed, indicated by segments 454, 456, and 458 by way of port 42 to the PNS server and, in turn, to a provider server 24. The provider server 24 returns a 200OK message, indicated by the segments 462 and 464, provided to the PNS agent 34 by way of the PNS server 28.

The client application sends a create channel message, indicated by the segment 468 that is provided to the PNS agent 34. Then, and as indicated by the segment 472, the PNS agent generates a subscribe request.

Thereby, when the client application is running and the removal storage element is removed and replaced, the PNS agent notifies the client application of the change, unsubscribes the client application from the PNS service, and resubscribes to the PNS service to reinitiate the push notification service.

The sequence 446 commences with launching of the application in the background, indicated by the block 482. Once the application is launched and is active, the client application generates a create session message, indicated by the segment 484, that is provided to the PNS agent. The PNS agent responds with an on create session complete message 486. Additionally, thereafter, the PNS agent sends the client application an on SIM change message, indicated by the segment 488. The PNS agent also sends an unsubscribe request, indicated by the segments 492, 494, and 496 that is routed by way of the port 42 and the PNS server 28 for delivery to the provider server 24. The server 24 responds with a 200OK message, indicated by the segments 502 and 504. The client application further generates a create channel message, indicated by the segment 506.

Thereby, the sequence 446 launches an application, notifies the application of the change out of the removable storage element and unsubscribes the client application from the PNS service to permit subsequent resubscription for the service.

Figure 5:
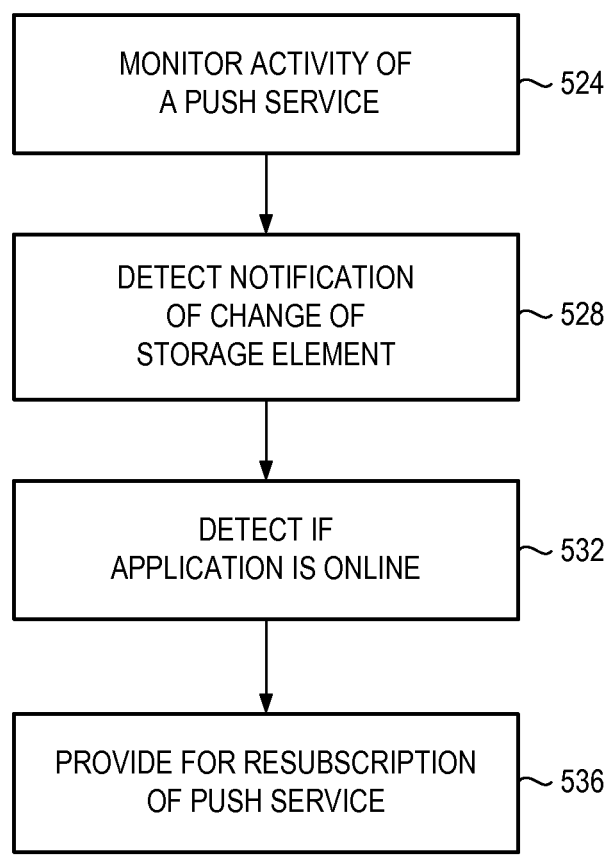
FIG. 5 illustrates a method flow diagram representative of the method of operation of an implementation of the present disclosure.

FIG. 5 illustrates a method flow diagram 522 representative of the method of operation of an implementation of the present disclosure.

First, and as indicated by the block 524, activity of a push service is monitored. Then, and as indicated by the block 528, notification of change of the removable storage element is detected. And, as indicated by the block 532, detection is made as to when the push service is online. Thereafter, and as indicated by the block 536, provision is made for resubscription of the push service to receive push messages subsequent to change of the removable storage element.

Thereby, a manner is provided by which to provide for resubscription to a push notification service at a communication device at which a SIM card, or other removable storage element, is hot swapped during operation of the communication device.

Presently preferred implementations of the disclosure and improvements and advantages thereof have been described with a degree of particularity. The description is of preferred examples of implementing the disclosure, and the description of examples is not necessarily intended to limit the scope of the disclosure. The scope of the disclosure is defined by the following claims.

What is claimed is:

1. A method for facilitating operation of a push service that pushes notifications to a communication device having a removable storage element, said method comprising:
    detecting notification of change of the removable storage element, the change comprising replacement of the removable storage element with an alternate removable storage element, wherein the communication device was previously subscribed to the push service based on the removable storage element and wherein the push service to the communication device is subsequently disabled;
    determining a resubscription process to perform based on whether a client application, on the communication device and associated with the push service, is currently active;
    performing the resubcription process to resubscribe to the push service and resume receiving the notifications directed to the communication device.

2. The method of claim 1 wherein the detecting comprises detecting hot-swapping of the removable storage element with the alternate removable storage element.

3. The method of claim 1 further comprising monitoring activity of the client application at the communication device.

4. The method of claim 1 wherein, when the client application is not currently active, the resubscription process is determined to comprise initiating launching of the client application.

5. The method of claim 4 wherein the initiating launching comprises requesting launching of the client application as a background operation.

6. The method of claim 5 further comprising detecting when the client application is active.

7. The method of claim 6 wherein the detecting when the client application is active comprises detecting reception of a session initiation request generated by the client application.

8. The method of claim 1 wherein the resubcription process comprises notifying the client application of the change of the removable storage element when the client application is active.

9. The method of claim 1 wherein the resubscription process comprises generating a request to unsubscribe from the push service.

10. The method of claim 1 wherein the alternate removable storage element stores different information compared to the removable storage element.

11. The method of claim 1 wherein the resubcription process is performed responsive to a user-generated command.

12. An apparatus for facilitating operation of a push service that pushes notifications to a communication device having a removable storage element, the apparatus comprising:
    a processor configured to at least:
        detect notification of change of the removable storage element, the change comprising replacement of the removable storage element with an alternate removable storage element, wherein the communication device was previously subscribed to the push service based on the removable storage element and wherein the push service to the communication device is subsequently disabled;
        determine a resubscription process to perform based on whether a client application, on the communication device and associated with the push service, is currently active;
        perform the resubcription process to resubscribe to the push service and resume receiving the notifications directed to the communications device.

13. The apparatus of claim 12 wherein the processor is further configured to monitor activity of the client application.

14. The apparatus of claim 12 wherein the resubscription process comprises unsubscribing the client application from the push service and then resubscribing the client application to the push service.

15. The apparatus of claim 14 wherein, when the client application is not currently active, the resubscription process comprises launching the client application; once launched, unsubscribe the client application from the push service; and resubscribe the client application to the push service.

16. Non-transitory computer-readable media configured, when executed by a computing device, to facilitate operation of a push service that pushes notifications to a communication device having a removable storage element, by causing the computing device to at least:
    detect notification of change of the removable storage element, the change comprising replacement of the removable storage element with an alternate removable storage element, wherein the communication device was previously subscribed to the push service based on the removable storage element and wherein the push service to the communication device is subsequently disabled;
    determine a resubscription process to perform based on whether a client application, on the communication device and associated with the push service, is currently active;
    perform the resubcription process to resubscribe to the push service and resume receiving the notifications directed to the communications device.

17. The non-transitory computer-readable media of claim 16 wherein the computing device is caused to detect hot-swapping of the removable storage element with the alternate removable storage element.

18. The non-transitory computer-readable media of claim 16 wherein the computing device is caused to monitor activity of the client application.

19. The non-transitory computer-readable media of claim 16 wherein the computing device is caused automatically to determine and perform the resubcription process subsequent to the change of the removable storage element.

20. The non-transitory computer-readable media of claim 16 wherein the resubcription process comprises unsubscribing the client application from the push service and then resubcribing the client application to the push service.

* * * * *